United States Patent
Lai et al.

(10) Patent No.: US 7,471,489 B2
(45) Date of Patent: Dec. 30, 2008

(54) HEAD/ARM SUBASSEMBLY AND HEAD STACK ASSEMBLY FOR MEDIA SERVOWRITER

(75) Inventors: Kien-Wee Lai, Singapore (SG);
Wei-Min Wang, Palo Alto, CA (US);
Jui-Kiat Goh, Singapore (SG)

(73) Assignee: LaserResearch (S) Pte Ltd, Singapore (SG)

( * ) Notice: Subject to any disclaimer, the term of this patent is extended or adjusted under 35 U.S.C. 154(b) by 550 days.

(21) Appl. No.: 11/229,526

(22) Filed: Sep. 20, 2005

(65) Prior Publication Data

US 2006/0061912 A1    Mar. 23, 2006

Related U.S. Application Data

(60) Provisional application No. 60/610,956, filed on Sep. 20, 2004.

(51) Int. Cl.
*G11B 5/55* (2006.01)

(52) U.S. Cl. .................................. 360/265.7; 360/245.2

(58) Field of Classification Search ............. 360/265.7, 360/265.9, 266.1, 244.5, 245.2
See application file for complete search history.

(56) References Cited

U.S. PATENT DOCUMENTS

| | | | |
|---|---|---|---|
| 4,402,025 A | | 8/1983 | Anderson et al. |
| 4,851,943 A | * | 7/1989 | Perry ........................ 360/254.3 |
| 5,099,373 A | | 3/1992 | Shibata et al. |
| 5,404,636 A | | 4/1995 | Stefansky et al. |
| 5,844,754 A | | 12/1998 | Stefansky et al. |
| 6,055,133 A | | 4/2000 | Albrecht et al. |
| 6,775,106 B1 | | 8/2004 | William et al. |
| 6,941,641 B2 | | 9/2005 | Van Solun |
| 7,193,819 B1 | * | 3/2007 | Chen et al. ................ 360/265.7 |
| 2004/0123448 A1 | | 7/2004 | Nguyen et al. |
| 2006/0061912 A1 | * | 3/2006 | Lai et al. .................. 360/265.7 |
| 2006/0158786 A1 | * | 7/2006 | Shimizu et al. ........... 360/265.7 |

* cited by examiner

*Primary Examiner*—A. J. Heinz
(74) *Attorney, Agent, or Firm*—Lawrence Y D Ho & Associates Pte Ltd

(57) ABSTRACT

The present invention provides unamount head/arm subassemblies and read-write head stack assembly for a disk drive, and a servowriter having the head stack assembly. Each head/arm subassembly is assembled and aligned individually so that multiple head/arm subassemblies can be installed on a mounting block to build the head stack assembly with all heads being properly aligned. In addition, each head/arm subassembly can be disassembled independently, facilitating easy rework on individual defect head.

15 Claims, 8 Drawing Sheets

US 7,471,489 B2

HEAD/ARM SUBASSEMBLY AND HEAD STACK ASSEMBLY FOR MEDIA SERVOWRITER

RELATED APPLICATION

This application claims the benefit under 35 U.S.C. 119(e) of U.S. Provisional Application Ser. No. 60/610,956, filed Sep. 20, 2004, which is herein incorporated by reference.

FIELD OF THE INVENTION

The present invention relates to multi-disk media servowriters and, more particularly, a media servowriter with a head stack assembly having removable head/arm subassemblies.

BACKGROUND OF THE INVENTION

A computer readable disk has thin layers of magnetic material coated on its surfaces. Storage data are laid down along circular tracks around the disk surface. To enable a read-write head to know where it is positioned, servo data is pre-recorded along circular tracks on the disk. These servo data contains information being read by the head and subsequently being interpreted by the servo system firmware to determine which track the head is on. For one offline media servo-writing scheme, the servo data pre-recording process is carried out before the disks are placed inside a hard drive. The disks are servo-written on a dedicated equipment (media servowriter) inside the clean room. One advantage of this scheme is that multiple disks (usually 5 to 25 disks) can be servo-written at one time using the same set of hardware. As hard drives nowadays usually only contain one to two disks, in-drive servo-writing (disk media installed in the disk drive before servo writing) can take up a lot of clean room space and time. By servo-writing multiple disks outside the drive, usage of clean room space and time can be substantially reduced. Using higher performance components such as high precision air bearing spindle and high resolution positioner, a dedicated equipment for servo-writing is capable of writing servo-tracks with higher quality. This becomes especially important as the track density of the disk media increases.

For consumer electronic applications, small form factor disk drives are most popular for MP3 player, hand held digital organizer or cell phone and GPS devices and so on. A uni-mount style head is needed for media servo writing on these types of disk media. The characteristic of this kind of head is the pivot arm which is made of stainless sheet metal and welded with head suspension to become one integrated component; hence the traditional E-block to mount heads is not required. One of the prior arts (U.S. Pat. No. 6,055,133 by Albrecht) shows the unamount style head suspension assemblies that stack multiple spacers and heads together.

FIG. 1 shows an exploded view of a unamount head/arm subassembly with two read-write heads known to those skilled in the art. The unamount head/arm subassembly is typically assembled by mounting two head/arm units 2 and an actuator arm 3 on an assembly bearing 4 and locking the assembly with a square nut 1, wherein the actuator arm is interposing between the two head/arm units. The head alignment is accomplished by inserting a pin 6 into the two tooling holes 5 of both head/arm units. FIG. 2 shows a perspective view of the assembled unamount head/arm subassembly as shown in FIG. 1. The alignment capability is +/−0.002" for two heads.

FIG. 3 shows a partially exploded view of a unamount head stack assembly comprising a plurality of unamount head/arm subassembly. As afore-mentioned, each unamount head/arm subassembly comprises two head/arm units 2 that are interposed with a spacer 7. The plurality of unamount head/arm subassemblies are mounted onto an assembly bearing 8, and locked with a collar 9a and a nut 9b. FIG. 4 shows a perspective view of the assembled unamount head stack assembly as shown in FIG. 3. Again, the head alignment is accomplished by inserting a pin 10 into the tooling holes through about 10 to 50 head/arm units. The alignment capability is +/−0.005" at best. When one or more read-write heads are not working properly, the whole assembly has to be dismantled in order to rework on the malfunction heads. The extra handling will damage the sensitive head/arm subassemblies.

In practice, epoxy is used to prevent looseness before assembly is tightened together with a nut. It might be all right for disk drive with one or two heads. In this case, whenever the head rework is needed, just disassemble the whole head stack or scrap the whole assembly. For a media servo writer, 5 to 25 media disks are written at the same time, and the head stack assembly includes 10 to 50 heads (each disk surface needs one head). It is not practical to disassemble whole arm/actuator in order to rework one or two defective heads.

Furthermore, it is especially crucial for small form factor drive that outside track should start as close to the disk outer diameter as possible so that the predictable number of tracks can be written and disk drive capacity can be guaranteed. In addition, the heads need to be aligned as close as possible in order to make sure that all heads will start from the same most inward or outward positions of the disks to produce the highest number of data tracks.

SUMMARY OF THE INVENTION

Therefore, one objective of the present invention is to provide a read-write head stack assembly suitable for any disk drive with multiple disks, especially the media servowriter, where the head stack assembly comprises a plurality of read-write head/arm subassemblies, and each subassembly can be removed from the head stack assembly and replaced without risking damages to the other heads.

Another objective of the present invention is to provide an apparatus and scheme to align together the heads of a read-write head/arm subassembly.

Yet another objective of the present invention is to modified the head skew angle without changing any head/arm subassembly to facilitate easy change over to different disk drive products.

Yet another objective of the present invention is to provide a guiding hole on each interpose arm to accept a head comb, where the head comb pushes heads to bend backward so that there is no interference between the heads and disks, eliminating head or disk damages.

In one aspect of the present invention, there is provided a unamount head/arm subassembly for a head stack assembly of a disk drive, where the head/arm subassembly comprises two head/suspension units, where each head/suspension unit has at one end one read-write head for reading from and writing onto a disk of the disk drive and at the other end an arm with a head/suspension assembly pivot hole; an interpose arm for interposing between the two head/suspension units, where the interpose arm has an interpose arm assembly hole at one end; a pair of disk shape clamps, where the disk shape clamps have steps that are loosely fit with the head/suspension assembly pivot holes and the interpose arm assembly hole such that both head/suspension units are concentric relative to the interpose arm assembly hole when the unamount head/arm subassembly with the interpose arm interposing between the two hear/arm units is assembled; and a screw for locking the disk shape clamps; thereby the head/arm subassembly is assembled by interposing the interpose arm between the two head/suspension units and locking the head/suspension units and interpose arm together with the disk shape clamps and screw. In one embodiment, the unamount head/arm subassembly further comprises a head comb; wherein the head comb has a forked structure at one end with two tapered beams, where the two tapered beams are tapered from the tip to the center of the head comb, and an inserting pin is positioned between the two tapered beams; and wherein the interpose arm has a guiding hole at the end opposite to the interpose arm assembly hole, and the guiding hole mates with the inserting pin so that the head comb holds the heads backwards with equal distance. In another embodiment, wherein the interpose arm has one positioner hole and one positioner slot for defining the location and orientation of the unamount head/arm subassemblies when they are further assembled. In yet another embodiment, the interpose arm has 2 datum edges at its mounting datum surface, wherein the datum edges and mounting datum surface define the location and orientation of the unamount head/arm subassemblies when they are further assembled.

In another aspect of the present invention, there is provided a read-write head stack assembly for a disk drive with a disk assembly of multiple disks, where the head stack assembly comprises a mounting block; a plurality of mounting pins, wherein the mounting pins are positioned onto the mounting block; a plurality of screws; and a plurality of head/arm subassemblies being disposed onto the mounting block; wherein each head/arm subassembly comprises two head/suspension units, wherein each head/suspension unit has at one end one read-write head for reading from and writing onto a disk of the disk drive and at the other end an arm with a head/suspension assembly pivot hole; an interpose arm for interposing between the two head/suspension units, wherein the interpose arm has an interpose arm assembly hole at one end; a pair of disk shape clamps, wherein the disk shape clamps have steps that are loosely fit with the head/suspension assembly pivot holes and the interpose arm assembly hole such that both head/suspension units are concentric relative to the interpose arm assembly hole when the unamount head/arm subassembly with the interpose arm interposing between the two hear/arm units is assembled; and a screw for locking the disk shape clamps; thereby the head/arm subassembly is assembled by interposing the interpose arm between the two head/suspension units and locking the head/suspension units and interpose arm together with the disk shape clamps and screw; and wherein the interpose arm has one positioiner hole and one positioner slot that are mated with the mounting pins so as to define the location and orientation of the unamount head/arm subassemblies when they are disposed onto the mounting block.

In yet another aspect of the present invention, there is provided a read-write head stack assembly for a disk drive with a disk assembly of multiple disks, where the head stack assembly comprises a mounting block with datum edges for receiving head/arm subassemblies; a plurality of screws for securing the head/arm subassemblies onto the mounting block; and a plurality of head/arm subassemblies being disposed onto the mounting block; wherein each head/arm subassembly comprises two head/suspension units, wherein each head/suspension unit has at one end one read-write head for reading from and writing onto a disk of the disk drive and at the other end an arm with a head/suspension assembly pivot hole; an interpose arm for interposing between the two head/suspension units, wherein the interpose arm has an interpose arm assembly hole at one end; a pair of disk shape clamps, wherein the disk shape clamps have steps that are loosely fit with the head/suspension assembly pivot holes and the interpose arm assembly hole such that both head/suspension units are concentric relative to the interpose arm assembly hole when the unamount head/arm subassembly with the interpose arm interposing between the two hear/arm units is assembled; and a screw for locking the disk shape clamps; thereby the head/arm subassembly is assembled by interposing the interpose arm between the two head/suspension units and locking the head/suspension units and interpose arm together with the disk shape clamps and screw; and wherein the interpose arm has 2 datum edges at its mounting datum surfaces, and wherein the datum edges of the interpose arm are matched with datum edges of the mounting block as so to define the location and orientation of the unamount head/arm subassemblies when they are disposed onto the mounting block.

In yet other aspects of the present invention, there are provided servowriters for servo writing a plurality of disks simultaneously, where the servowriters comprise a disk hub having a plurality of disks onto which servo information are written, wherein the disk hub is driven by a disk hub spindle at high speed; a read-write head stack assembly with the number of heads corresponding to the number of the disks in the disk hub; and an actuator motor for driving the read-write head stack assembly so that the servo information can be written onto the disks by the heads of the read-write head stack assembly; wherein the read-write head stack assemblies are described above.

In yet another aspect of the present invention, there is provided a method for producing a head stack assembly comprising a plurality of head/arm subassemblies, where each head/arm subassembly can be removed from the head stack assembly individually, the method comprising the following steps of providing a plurality of head/arm subassembly; disposing each head/arm subassembly precisely onto a mounting block of the head stack assembly, wherein the location and orientation of each head/arm subassembly are defined by the mating between the head/arm subassembly and the mounting block; and securing each head/arm subassembly onto the mounting block by a fastening means.

The above and other objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

Figure 1:
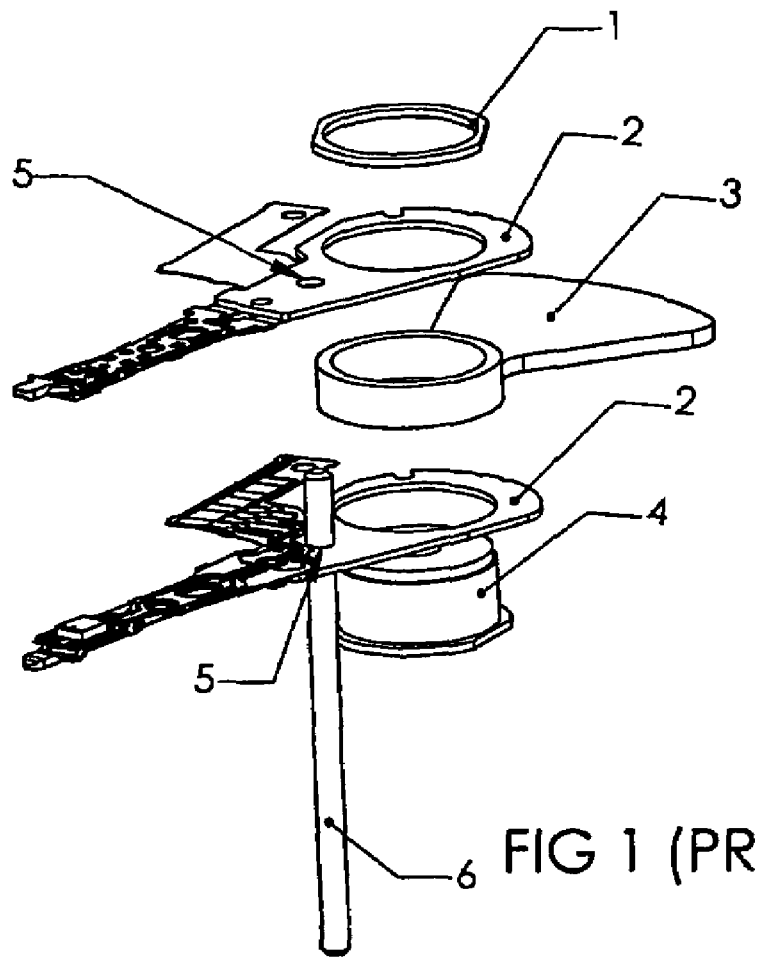
FIG. 1 shows an exploded view of a unamount head/arm subassembly with two read-write heads known to those skilled in the art.
Figure 2:
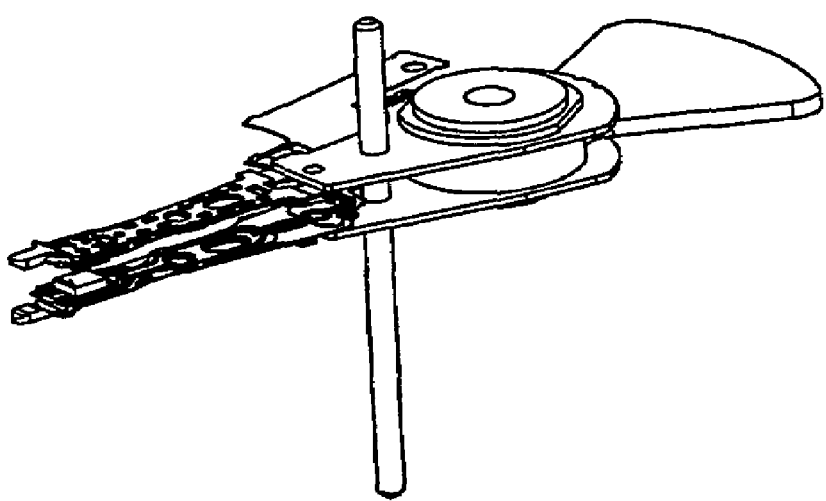
FIG. 2 shows a perspective view of the assembled unamount head/arm subassembly as shown in FIG. 1.
Figure 3:
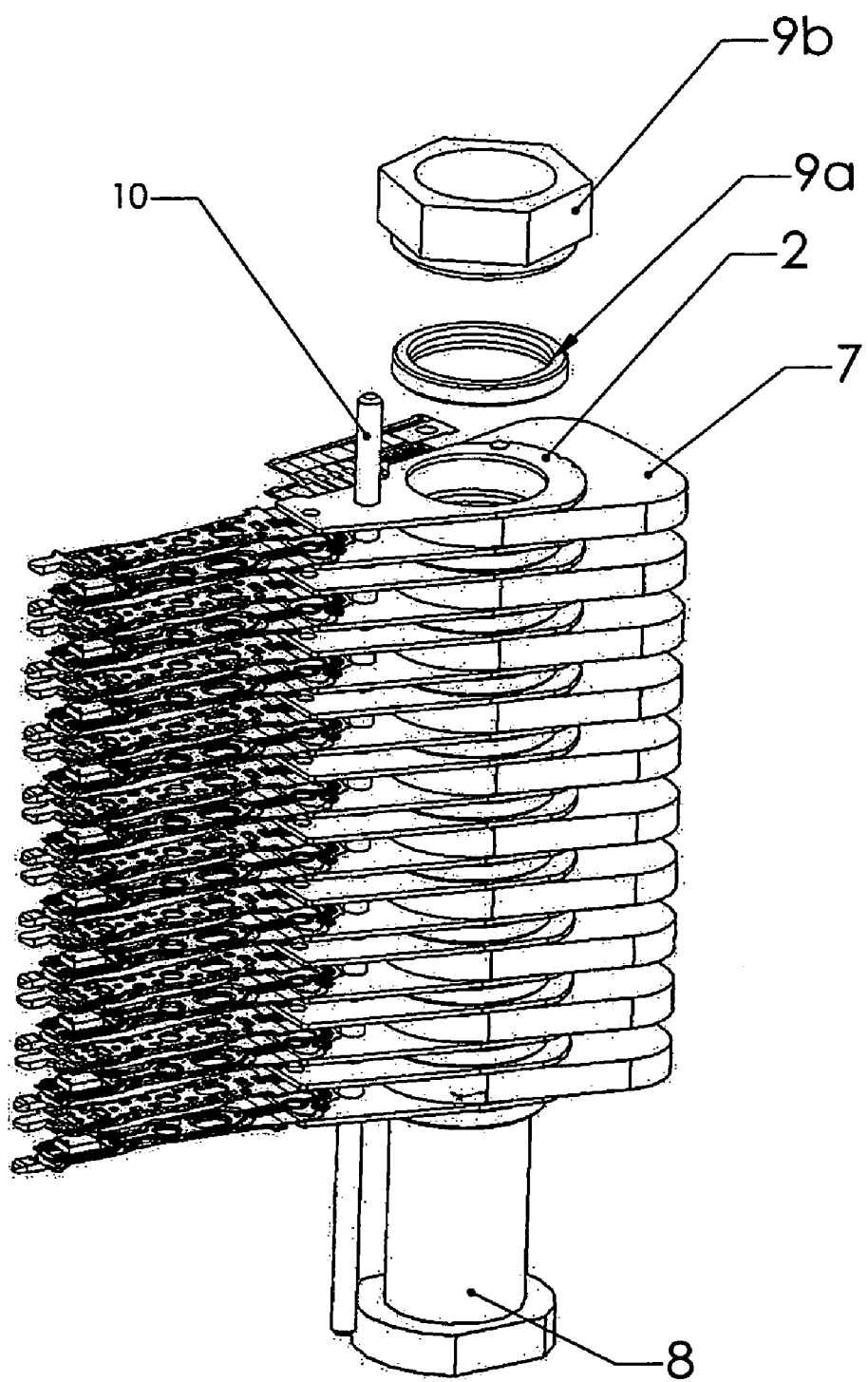
FIG. 3 shows a partially exploded view of a head stack assembly comprising a plurality of head/arm subassemblies known to those skilled in the art.
Figure 4:
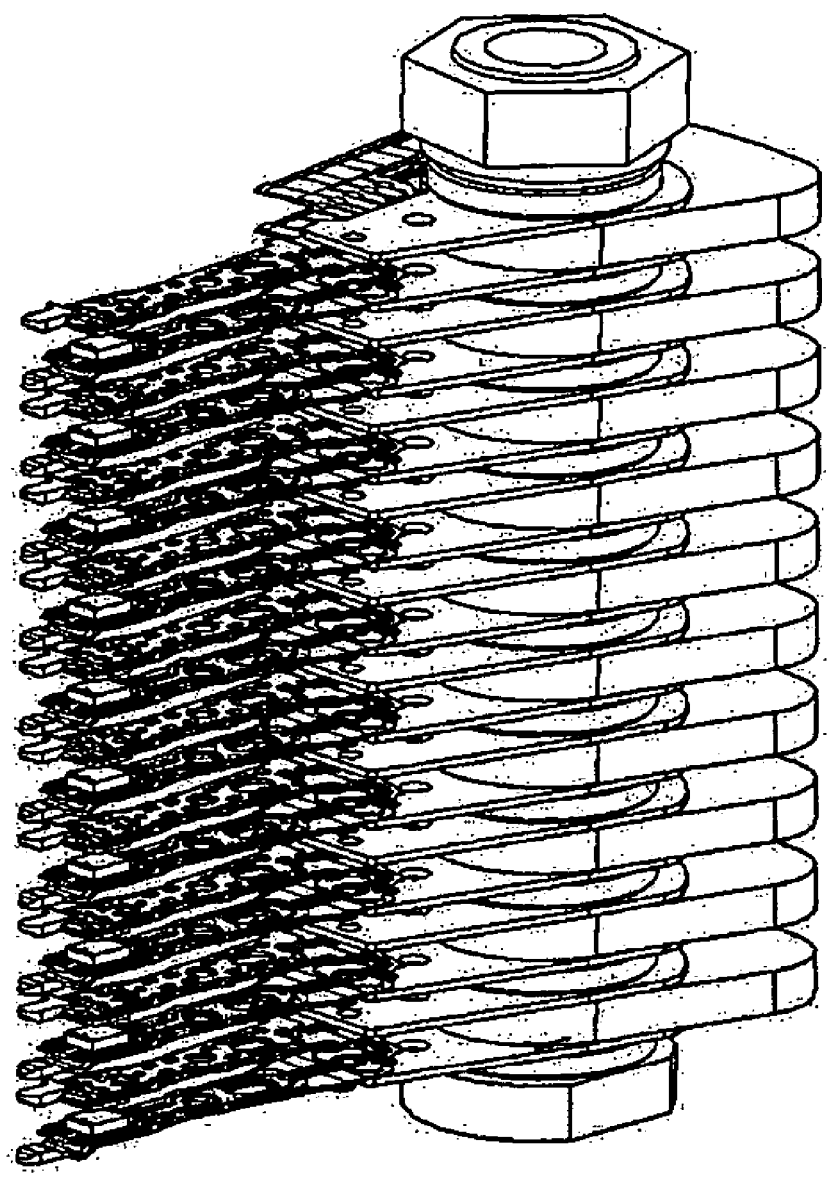
FIG. 4 shows a perspective view of the assembled head stack assembly as shown in FIG. 3.
Figure 5:
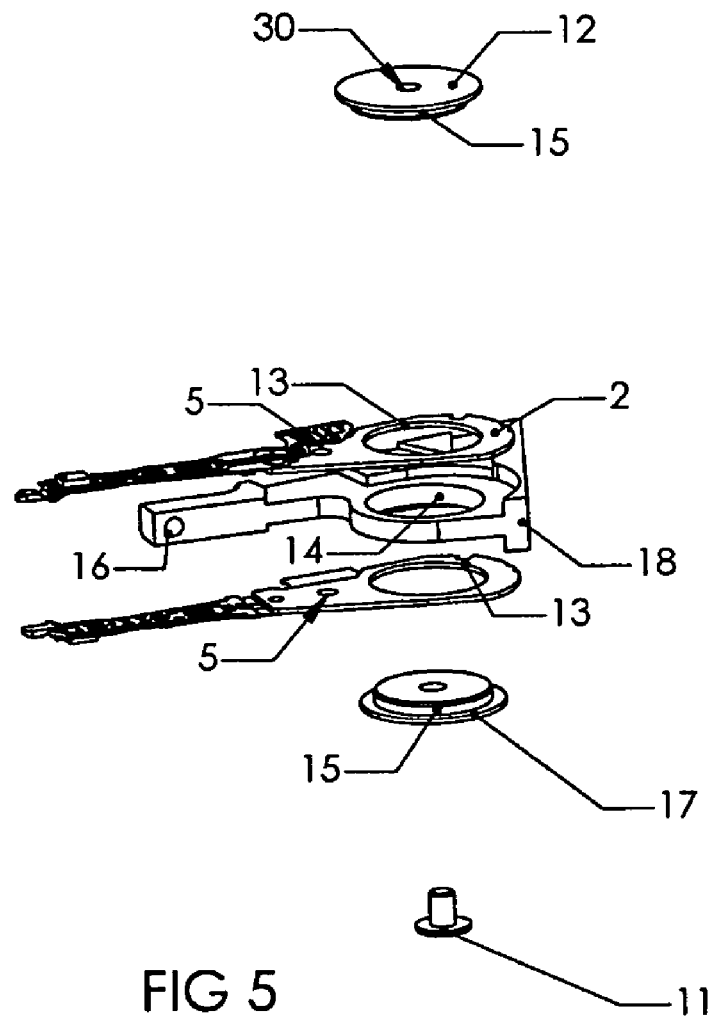
FIG. 5 shows an exploded view of a unamount head/arm subassembly with two head/arm units in accordance with one preferred embodiment of the present invention.
Figure 7:
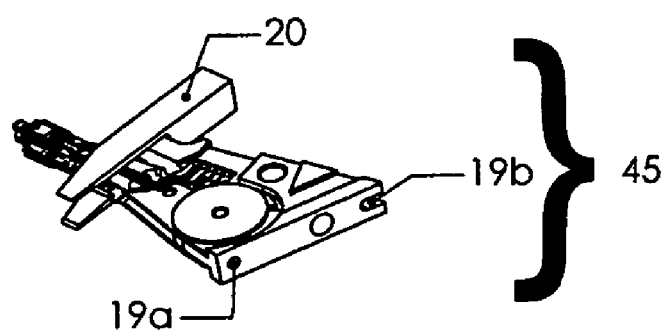
Figure 6:
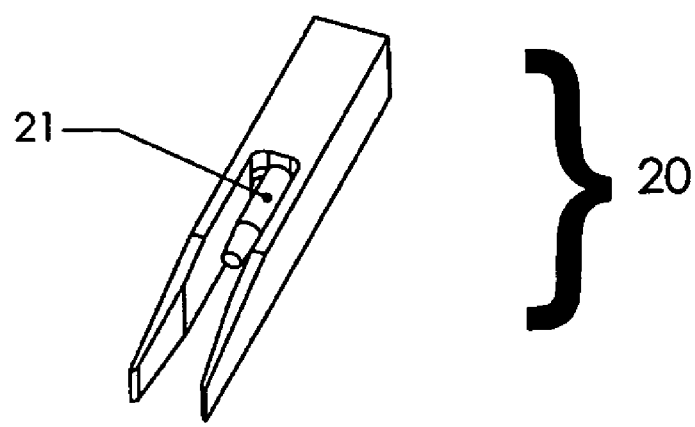
FIG. 6 shows a perspective view of a process comb that bend the suspensions of the two heads of the unamount head/ arm subassembly as shown in FIG. 5 in accordance with one embodiment of the present invention.

FIG. 7 shows a perspective view of an assembled unamount head/arm subassembly with the process comb as shown in FIG. 5 and FIG. 6.

Figure 8:
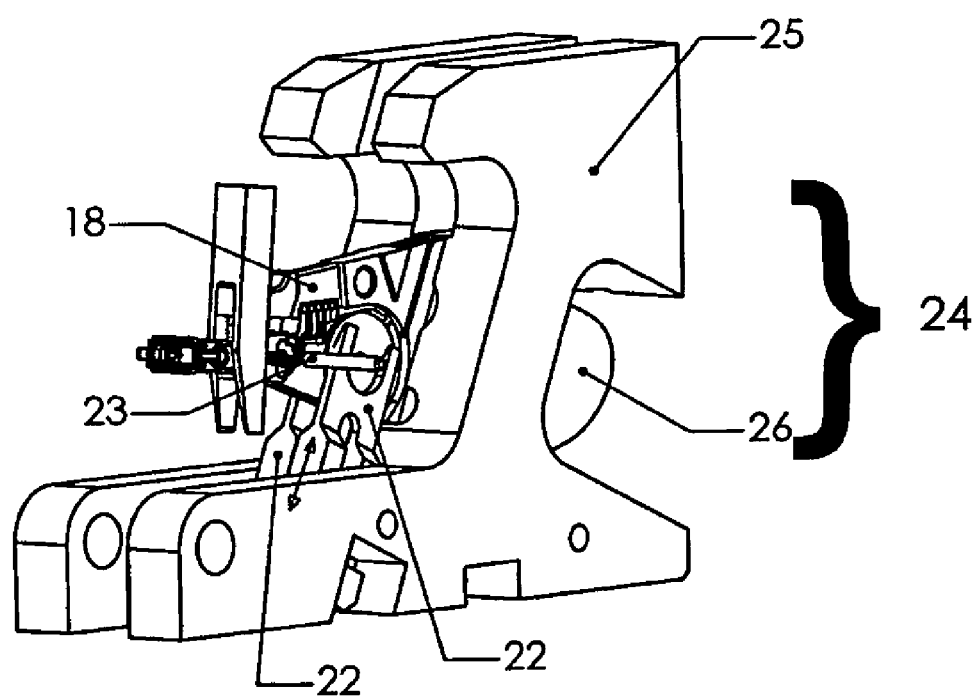

FIG. 8 shows a perspective view of the head/arm assembling apparatus for assembling a head/arm subassembly in accordance with one embodiment of the present invention.

Figure 9:
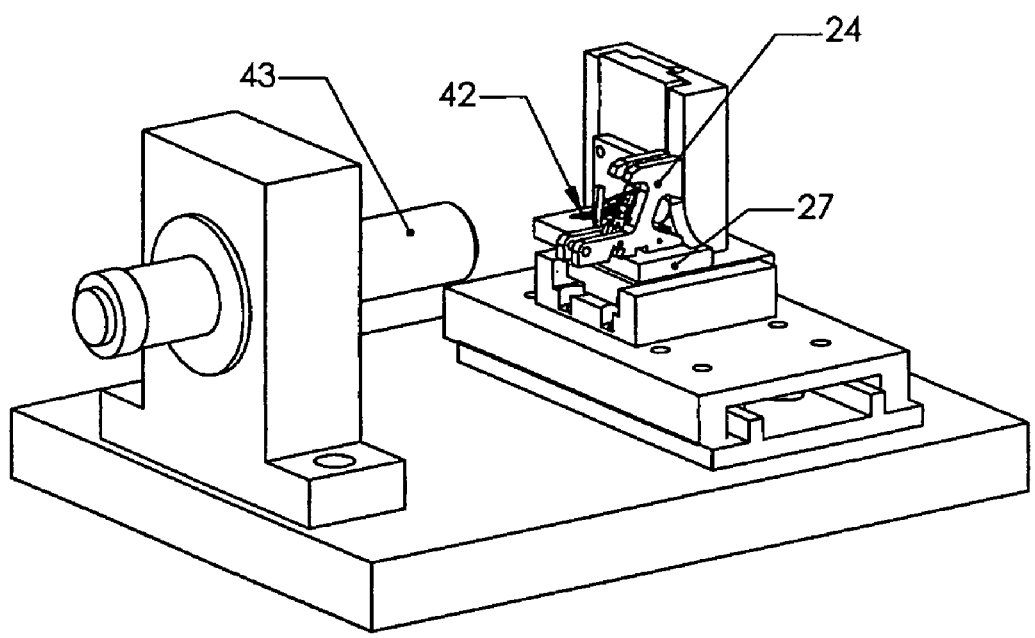

FIG. 9 shows a perspective view of the alignment apparatus for final assembling of the head/arm subassembly and aligning the heads of the head/arm subassembly in accordance with one embodiment of the present invention.

Figure 10:
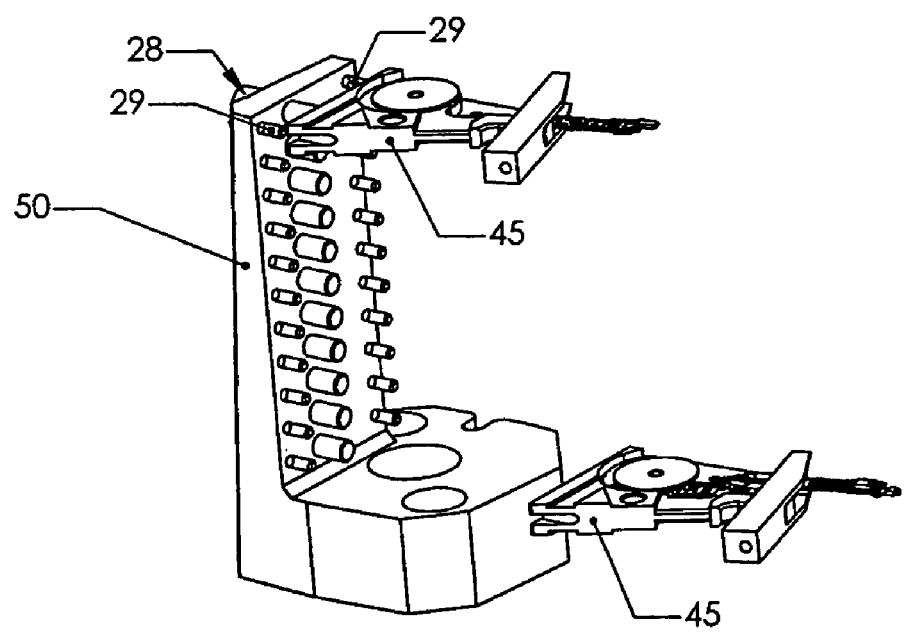

FIG. 10 shows a perspective view of a read-write head stack assembly showing one positioned head/arm subassembly in accordance with one embodiment of the present invention.

Figure 11:
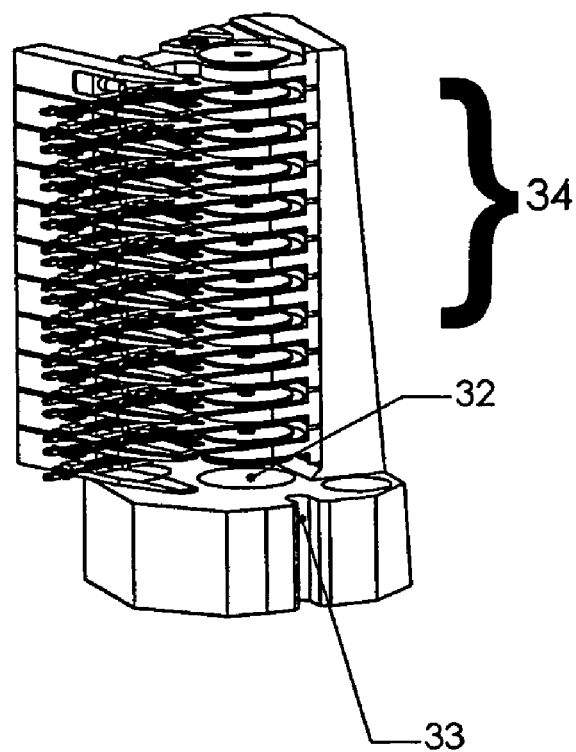

FIG. 11 shows a perspective view of the read-write head stack assembly with 11 head/arm subassemblies in accordance with one embodiment of the present invention.

Figure 12:
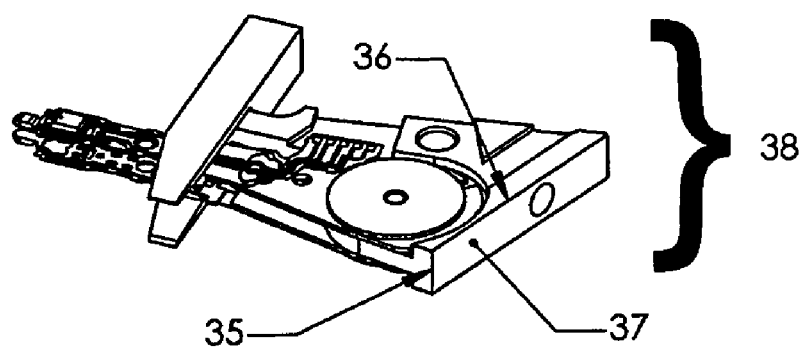

FIG. 12 shows a perspective view of one head/arm subassembly with datum edges at its mounting datum surface in accordance with another embodiment of the present invention.

Figure 13:
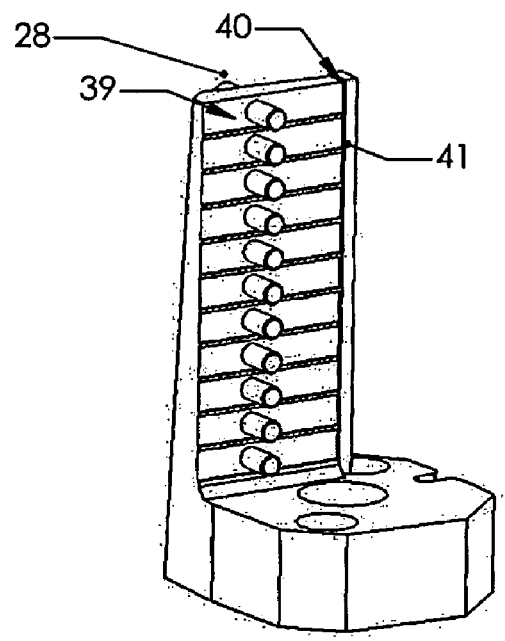

FIG. 13 shows a perspective view of a mounting block accommodating the head/arm subassemblies shown in FIG. 12.

Figure 14:
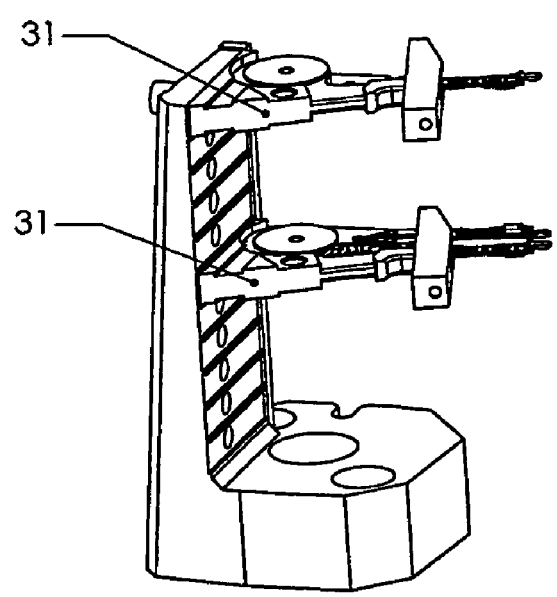

FIG. 14 shows a perspective view of one head stack assembly with two head/arm subassemblies positioned on the mounting block in accordance with another embodiment of the present invention.

DETAILED DESCRIPTION OF THE INVENTION

The present invention may be understood more readily by reference to the following detailed description of certain embodiments of the invention. However, it will be understood by those skilled in the relevant art that the present invention may be practiced without these specific details. In other instances, well-known methods, procedures, and components have not been described in detail so as not to obscure the present invention.

Throughout this application, where publications are referenced, the disclosures of these publications are hereby incorporated by reference, in their entireties, into this application in order to more fully describe the state of art to which this invention pertains.

The present invention is intended to provide a read-write head stack assembly that comprises a plurality of read-write head/arm subassemblies, where the read-write head stack assembly can be employed in a disk drive such as media servowriter for reading from and writing onto a plurality of disks simultaneously. One of the unique features of the read-write head stack assembly of the present invention is that each of the read-write head/arm subassemblies is individually aligned and assembled into the read-write head stack assembly so that any of the read-write head/arm subassemblies can be removed or inserted into the read-write head stack assembly without affecting other subassemblies. While the following description will disclose a unamount read-write head/arm subassembly with two unamount read-write head/arm units, other read-write head/arm subassemblies may also be used to assemble the read-write head stack assembly. For example, the unamount read-write head/arm subassembly can have only one read-write head/arm unit. Or each read-write head/arm unit has two heads. Furthermore, the read-write head stack assembly can be employed in any suitable hard drive with multiple disks.

Now referring to FIG. 5, there is provided a unamount head/arm subassembly with two head/suspension units in accordance with one preferred embodiment of the present invention. The unamount head/arm subassembly comprises two unamount head/suspension units 2, an interpose arm 18, a pair of disk shape clamps 12, 17, and a screw 11 for locking the disk shape clamps. Each of the unamount head/suspension units has a read-write head at one end and an arm at the other end with a head/suspension assembly pivot hole 13. The interpose arm 18 has a guiding hole 16 at one end for accommodating a pin 21 of a head comb 20 discussed in detail hereinafter, and an interpose arm assembly hole 14 at the other end. Each of the pair of disk shape clamps 12, 17 has a step 15, and one of the disk shape clamp has a thread 30. The steps 15 of the disk shape clamps 17, 12 are loosely fit with the head/suspension assembly pivot holes 13 and the interpose arm assembly hole 14 such that both head/suspension units are concentric relative to the interpose arm assembly hole when the unamount head/arm subassembly with the interpose arm interposing between the two hear/arm units is assembled. As shown in FIG. 6, the head comb 20 has a forked structure at one end with two tapered beams, where the two tapered beams are tapered from the tip to the center of the head comb, and the inserting pin 21 is positioned between the two tapered beams.

As shown in FIG. 7, there is provided a perspective view of the assembled unamount head/arm subassembly including the head comb. It is to be appreciated that the head comb 20 with the inserting pin 21 holds the heads in a lift-up position to clear heads from the disks interference during the merge operation of head and disk assembly. In addition, FIG. 7 shows that the interpose arm 18 has one positioner hole 19a and one positioner slot 19b that define the location and orientation of the unamount head/arm subassemblies when they are mounted onto a mounting block discussed in detail hereinafter. The inserting pin 21 mated with the guiding hole 16 of the interpose arm 18 in such a way that both heads bend backward by the taper beam in equal amount by design.

Referring now to FIG. 8, there is provided the apparatus and method for putting together a head/arm subassembly in accordance with one embodiment of the present invention. The head/arm assembling apparatus comprises a fixture 25 that has provisions to secure the interpose arm, providing the support for the head/arm subassembly to be assembled. The head/arm assembling apparatus further comprises a thumb screw 26 for temporarily securing the interpose arm 18 onto the fixture 25 when the interpose arm is disposed onto the fixture. The head/arm assembling apparatus further comprises a pair of spring holddown bars 22. After the interpose arm is secured onto the fixture, the head/suspension units 2 are sequentially disposed onto the two sides of the interpose arm. For example, one head/suspension unit is disposed onto the left side (facing the viewer) and secured with the disk shape clamp 17, where the step 15 of the disk shape clamp 17 is mated pivotally with the head/suspension assembly pivot hole 13 and the interpose arm assembly hole 14. Then, by moving one of the spring holddown bars upward, the spring holddown bar 22 will hold the disk shape clamp 17 and the head/suspension unit 2 against the interpose arm 18. Repeat the same procedure with the other side of the interpose arm, where the disk shape clamp 12 with thread 30 is mated pivotally with the head/suspension assembly pivot hole and the interpose arm assembly hole. The disk shape clamp and the head/suspension unit will be held against the interpose arm by the spring holddown bar. At this moment, the head/suspension units on both sides of the interpose arm are held loosely by the spring holddown bars so as to facilitate easy rotation pivotally around the assembly holes.

Now referring to FIG. 9, there is provided a head alignment apparatus in accordance with one embodiment of the present invention. The head alignment apparatus comprises a platform 27 and an inspection system 43. In one embodiment, the inspection system 43 comprises a microscope camera and a video display system. Prior to actual alignment, the head alignment apparatus is calibrated by a gold standard head/arm subassembly and adjust X-Z stage such that the head image is in the center position of the window on video monitor. For example, if +/−0.001" is the alignment specification of the head position and the microscope system is of 250 magnification, a +/−0.25" wide window of two parallel lines are drawn on the video monitor for the gold standard head to be aligned against. Consequently all head/arm subassemblies are aligned against same gold standard head location on gold standard head/arm subassembly. When the head/arm subassembly 24 as shown in FIG. 8 is in place, it is positioned onto the platform 27 where proper datum has been established to make sure that the locations of the heads measured by the microscope camera with high magnification are repeatable. The heads are adjusted by the pin 23 against the calibrated +/−0.001" window on the video monitor. Once the heads are aligned, the screw 11 can be tightened, and the heads are checked again. Then, the head comb 20 guided by the inserting pin 21 through the guiding hole 16 will bend the heads backward to prevent interference in the next assembly process. Then, the thumb screw 26 is loosened and the aligned head/arm subassembly 45 will be ready for the assembling of the head stack assembly. Since every set of head/arm subassembly is aligned by the same way at the same location, they will line up when they are assembled into the head stack assembly.

Now referring to FIG. 10, there is provided a brief description of the final assembly of the read-write head stack assembly in accordance with one embodiment of the present invention. The head stack assembly comprises a mounting block 50 and a plurality of mounting pins 29, where the mounting pins are positioned onto the mounting block such that they will mate with the positioner hole and positioner slot 19a, 19b of the interpose arm 18. The head stack assembly further comprises a plurality of screws 28 for securing the head/arm subassembly onto the mounting block. As shown in FIG. 5, the interpose arm 18 has between the positioner hole 19a and the positioner slot 19b a securing hole through which the screws 28 secure the head/arm subassemblies. When each head/arm subassembly is disposed onto the mounting block 50, a pair of the mounting pins 29 will define the head/arm subassembly's location precisely. As shown in FIG. 11, the assembled head stack assembly has a comb structure, where all head/arm subassemblies are equally spaced. While FIG. 11 shows a head stack assembly with 11 head/arm subassemblies, it is to be appreciated that any number of the head/arm subassemblies can be assembled into the head stack assembly following the principles of the present invention.

Still referring to FIG. 11, the read-write head stack assembly further comprises an actuator alignment hole 32. The actuator alignment hole 32 is to be aligned with the pivot shaft of an actuator so that the head/arm subassembly's pivot location is the actuator alignment hole 32 now, rather than the unamount head/suspension assembly pivot hole 13. It means that the unamount heads of the head stack assembly of the present invention can be used for different skew angle without switching to different heads. It greatly minimizes logistic and change-over problems during mass production. The head stack assembly further comprises an alignment slot 33. With alignment hole 32 and slot 33, the orientation of the heads is precisely defined.

Now referring to FIG. 12, there is provided another configuration of the interpose arm in the head/arm subassemblies in accordance with another embodiment of the present invention. The end of the interpose arm 18 has no position guiding hole or slot. Instead, the datum edges 35, 36 and the mounting surface 37 are used to define the positions of the head/arm subassemblies. FIG. 13 shows a corresponding mounting block 41 having corresponding matching edges 39, 40 for the edges 35, 36. Once both edges are mated against properly on the mounting surface, the position and orientation of head/arm subassembly is precisely defined. The mounting block 41 still uses the screws 28 to secure the head/arm subassemblies to the mounting block. FIG. 14 shows a head stack assembly with two head/arm subassemblies.

The head/arm subassembly and head stack assembly of the present invention may be employed in any suitable disk drives. A disk drive comprises a drive housing for housing all the components used in the drive, a disk assembly which store and/or output data, one or more read-write heads for transducing information from and onto the disks, one or more actuator arms for operating the read-write heads, and an actuator motor for driving the actuator arms. For example, a servowriter for servo writing a plurality of disks simultaneously comprises a disk hub having a plurality of disks onto which servo information are written, wherein the disk hub is driven by a disk hub spindle at high speed; a read-write head stack assembly with the number of heads corresponding to the number of the disks in the disk hub; and an actuator motor for driving the read-write head stack assembly so that the servo information can be written onto the disks by the heads of the read-write head stack assembly. Disk drives are known to those skilled in the art. Thus, there are no details provided for the disk drive's structures and operations.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A unamount head/arm subassembly for a disk drive, comprising:
    two head/suspension units, where each head/suspension unit has at one end one read-write head for reading from and writing onto a disk of the disk drive and at the other end an arm with a head/suspension assembly pivot hole;
    an interpose arm for interposing between the two head/suspension units, where the interpose arm has an interpose arm assembly hole at one end;
    a pair of disk shape clamps, where the disk shape clamps have steps that are loosely fit with the head/suspension assembly pivot holes and the interpose arm assembly hole such that both head/suspension units are concentric relative to the interpose arm assembly hole when the unamount head/arm subassembly with the interpose arm interposing between the two hear/arm units is assembled; and
    a screw for locking the disk shape clamps;
    thereby the head/arm subassembly is assembled by interposing the interpose arm between the two head/suspension units and locking the head/suspension units and interpose arm together with the disk shape clamps and screw.

2. The unamount head/arm subassembly of claim 1, further comprising a head comb; wherein the head comb has a forked structure at one end with two tapered beams, where the two tapered beams are tapered from the tip to the center of the head comb, and an inserting pin is positioned between the two tapered beams; and wherein the interpose arm has a guiding hole at the end opposite to the interpose arm assembly hole, and the guiding hole mates with the inserting pin so that the head comb holds the heads backwards.

3. The unamount head/arm subassembly of claim 1, wherein the interpose arm has one positioner hole and one positioner slot for defining the location and orientation of the unamount head/arm subassemblies when they are further assembled.

4. The unamount head/arm subassembly of claim 1, wherein the interpose arm has datum edges at its mounting datum surface, wherein the datum edges and the mounting datum surface define the location and orientation of the unamount head/arm subassemblies when they are further assembled.

5. A read-write head stack assembly for a disk drive with a disk assembly of multiple disks, comprising:
a mounting block;
a plurality of screws; and
a plurality of head/arm subassemblies being disposed onto the mounting block;
wherein the plurality of screws lock the plurality of the head/arm subassemblies so as to form the head stack assembly; and
wherein each head/arm subassembly comprises two head/suspension units, wherein each head/suspension unit has at one end one read-write head for reading from and writing onto a disk of the disk drive and at the other end an arm with a head/suspension assembly pivot hole;
an interpose arm for interposing between the two head/suspension units, wherein the interpose arm has an interpose arm assembly hole at one end;
a pair of disk shape clamps, wherein the disk shape clamps have steps that are loosely fit with the head/suspension assembly pivot holes and the interpose arm assembly hole such that both head/suspension units are concentric relative to the interpose arm assembly hole when the unamount head/arm subassembly with the interpose arm interposing between the two hear/arm units is assembled; and
a screw for locking the disk shape clamps;
thereby the head/arm subassembly is assembled by interposing the interpose arm between the two head/suspension units and locking the head/suspension units and interpose arm together with the disk shape clamps and screw.

6. The read-write head stack assembly of claim 5, wherein the mounting block further comprises a plurality of mounting pins, wherein the mounting pins are positioned onto the mounting block; and wherein the interpose arm further comprises one positioner hole and one positioner slot so that they are mated with the mounting pins so as to define the location and orientation of the unamount head/arm subassemblies when they are disposed onto the mounting block.

7. The read-write head stack assembly of claim 5, wherein the mounting block further comprises a mounting surface; and wherein the interpose arm further comprises datum edges at its mounting datum surface; and wherein the datum edges and mounting datum surface of the interpose arm are matched with the mounting surface of the mounting block as so to define the location and orientation of the unamount head/arm subassemblies when they are disposed onto the mounting block.

8. The read-write head stack assembly of claim 5, wherein the head/arm subassembly further comprising a head comb; wherein the head comb has a forked structure at one end with two tapered beams, where the two tapered beams are tapered from the tip to the center of the head comb, and an inserting pin is positioned between the two tapered beams; and wherein the interpose arm has a guiding hole at the end opposite to the interpose arm assembly hole, and the guiding hole mates with the inserting pin so that the head comb holds the heads backwards.

9. The read-write head stack assembly of claim 5, wherein the mounting block further comprises an alignment hole and an alignment slot; where the alignment hole can be mated with an actuator pivot shaft so that a user can vary the location of the alignment hole to meet various skew angle requirements without changing the head/suspension subassemblies; and where the alignment hole and the alignment slot define the position and orientation of the heads of the head stack assembly.

10. The read-write head stack assembly of claim 5, wherein the disk drive is a servowriter.

11. A servowriter for servo writing a plurality of disks simultaneously, comprising:
a disk hub having a plurality of disks onto which servo information are written, wherein the disk hub is driven by a disk hub spindle at high speed;
a read-write head stack assembly with the number of heads corresponding to the number of the disks in the disk hub; and
an actuator motor for driving the read-write head stack assembly so that the servo information can be written onto the disks by the heads of the read-write head stack assembly;
wherein the read-write head stack assembly comprises:
a mounting block;
a plurality of screws; and
a plurality of head/arm subassemblies being disposed onto the mounting block;
wherein the plurality of screws lock the plurality of the head/arm subassemblies so as to form the head stack assembly; and
wherein each head/arm subassembly comprises two head/suspension units, wherein each head/suspension unit has at one end one read-write head for reading from and writing onto a disk of the disk drive and at the other end an arm with a head/suspension assembly pivot hole;
an interpose arm for interposing between the two head/suspension units, wherein the interpose arm has an interpose arm assembly hole at one end;
a pair of disk shape clamps, wherein the disk shape clamps have steps that are loosely fit with the head/suspension assembly pivot holes and the interpose arm assembly hole such that both head/suspension units are concentric relative to the interpose arm assembly hole when the unamount head/arm subassembly with the interpose arm interposing between the two hear/arm units is assembled; and
a screw for locking the disk shape clamps;
thereby the head/arm subassembly is assembled by interposing the interpose arm between the two head/suspension units and locking the head/suspension units and interpose arm together with the disk shape clamps and screw.

12. The servowriter of claim 11, wherein the mounting block further comprises a plurality of mounting pins, wherein the mounting pins are positioned onto the mounting block; and wherein the interpose arm further comprises one positioner hole and one positioner slot so that they are mated with the mounting pins so as to define the location and orientation of the unamount head/arm subassemblies when they are disposed onto the mounting block.

13. The servowriter of claim 11, wherein the mounting block further comprises a mounting surface; and wherein the interpose arm further comprises datum edges at its mounting datum surface; and wherein the datum edges and mounting datum surface of the interpose arm are matched with the mounting surface of the mounting block as so to define the location and orientation of the unamount head/arm subassemblies when they are disposed onto the mounting block.

14. The servowriter of claim 11, wherein the mounting block further comprises an alignment hole and an alignment slot; where the alignment hole can be mated with an actuator pivot shaft so that a user can vary the location of the alignment hole to meet various skew angle requirements without changing the head/suspension subassemblies; and where the alignment hole and the alignment slot define the position and orientation of the heads of the head stack assembly.

15. The servowriter of claim 11, wherein the head/arm subassembly further comprising a head comb; wherein the head comb has a forked structure at one end with two tapered beams, where the two tapered beams are tapered from the tip to the center of the head comb, and an inserting pin is positioned between the two tapered beams; and wherein the interpose arm has a guiding hole at the end opposite to the interpose arm assembly hole, and the guiding hole mates with the inserting pin so that the head comb holds the heads backwards.

* * * * *